UNITED STATES PATENT OFFICE.

JOHN MORRIS, OF LONDON, ENGLAND.

ARTIFICIAL FUEL.

SPECIFICATION forming part of Letters Patent No. 417,362, dated December 17, 1889.

Application filed August 7, 1889. Serial No. 320,007. (No specimens.)

*To all whom it may concern:*

Be it known that I, JOHN MORRIS, a subject of the Queen of Great Britain, residing at London, England, have invented a new and useful manufacture of an Improved Artificial Fuel, of which the following is a specification.

My invention relates to the manufacture of a slow combustion, smokeless, and inodorous fuel.

In manufacturing my improved fuel I mix and combine the following ingredients, viz: silicate of soda, nitrate of potassa, water, powdered charcoal, powdered carbonate of lime, and powdered binoxide manganese.

The proportions which I have found to give good results in practice are the following, viz: To a solution of about eighteen per cent., by weight, of silicate of soda, 1.5 per cent., by weight, of nitrate of potassa, and twenty per cent., by weight, of water at 212° Fahrenheit, I add about fifty-three per cent., by weight, of powdered charcoal, six per cent., by weight, of powdered carbonate of lime, and 1.5 per cent., by weight, of powdered binoxide manganese. The whole is intimately mixed, and is then molded by compression into the form of briquettes or bricks or other suitably-shaped blocks, and thoroughly dried at a low temperature.

The proportions given above are those which produce a fuel suitable for an average rate of combustion; but the rate of combustion can be increased or diminished by diminishing or increasing the percentage of the soda silicate.

My improved artificial fuel, being smokeless and inodorous and giving off no noxious fumes, can be burned without a flue, and is therefore especially applicable for warming carriages, for rooms and other places which have no flues, and is very useful for heating greenhouses.

Having now particularly described and ascertained the nature of my said invention and in what manner the same is to be performed, I declare that what I claim is—

The described improved artificial fuel formed by mixing and combining silicate of soda, nitrate of potassa, water, charcoal, carbonate of lime, and binoxide manganese, in about the proportions mentioned, and then compressing the composition into blocks, substantially as set forth.

JOHN MORRIS.

Witnesses:
 JOHN H. WILSON,
 JOHN E. BONSFIELD,
*Of the firm of J. F. Redfern & Co., 4 South Street, Finsbury, London.*